United States Patent
Kanemaru et al.

(10) Patent No.: US 9,904,277 B2
(45) Date of Patent: Feb. 27, 2018

(54) NUMERICAL CONTROLLER CONFIGURED FOR OPERATION BASED ON TABULAR DATA

(71) Applicant: FANUC Corporation, Minamitsuru-gun, Yamanashi (JP)

(72) Inventors: Akira Kanemaru, Minamitsuru-gun (JP); Yasushi Takeuchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 313 days.

(21) Appl. No.: 14/620,303

(22) Filed: Feb. 12, 2015

(65) Prior Publication Data
US 2015/0241867 A1 Aug. 27, 2015

(30) Foreign Application Priority Data
Feb. 21, 2014 (JP) .................... 2014-031581

(51) Int. Cl.
*G05B 19/409* (2006.01)
*G05B 19/4093* (2006.01)
*G05B 19/402* (2006.01)

(52) U.S. Cl.
CPC ..... *G05B 19/40937* (2013.01); *G05B 19/402* (2013.01); *G05B 2219/35172* (2013.01); *Y02P 90/265* (2015.11)

(58) Field of Classification Search
CPC ............ G05B 19/402; G05B 19/40937; G05B 19/18–19/4166; G05B 2219/35172; Y02P 90/265

USPC .................................................. 700/159–196
See application file for complete search history.

(56) References Cited

U.S. PATENT DOCUMENTS

| | | | |
|---|---|---|---|
| 4,692,856 A | 9/1987 | Komiya | |
| 5,154,935 A | 10/1992 | Kamiguchi et al. | |
| 2003/0191553 A1 | 10/2003 | Isohata | |
| 2006/0239386 A1 | 10/2006 | Endo et al. | |
| 2010/0004760 A1* | 1/2010 | Endo ................. | G05B 19/4155 700/13 |
| 2012/0296462 A1* | 11/2012 | Otsuki ............... | G05B 19/4069 700/104 |

(Continued)

FOREIGN PATENT DOCUMENTS

| | | |
|---|---|---|
| CN | 101367173 A | 2/2009 |
| DE | 10343809 A1 | 4/2004 |

(Continued)

OTHER PUBLICATIONS

Notification of Reasons for Refusal dated Jul. 7, 2015 in Japanese Patent Application No. 2014-031581 (3 pages) with an English Translation (3 pages).

(Continued)

*Primary Examiner* — Sean Shechtman
*Assistant Examiner* — Shon Foley
(74) *Attorney, Agent, or Firm* — Drinker Biddle & Reath LLP

(57) ABSTRACT

A numerical controller configured for operation based on tabular data identifies a control command, calculates an operating time to achieve a target state for the control command, determines a time, an axis position, or a spindle position, which serves as a reference for the start of the operation, and starts the operation.

6 Claims, 7 Drawing Sheets

(56) References Cited

U.S. PATENT DOCUMENTS

2015/0134100 A1* 5/2015 Iuchi .................. G05B 19/4155
                                                                700/159

FOREIGN PATENT DOCUMENTS

| EP | 2110727 A2 | 10/2009 |
|---|---|---|
| JP | 59-177604 A | 10/1984 |
| JP | 2003-122413 A | 4/2003 |
| JP | 2003-186510 A | 7/2003 |
| JP | 2003-303005 A | 10/2003 |
| JP | 2008-204410 A | 9/2008 |

OTHER PUBLICATIONS

Decision to Grant a Patent dated Sep. 8, 2015 in corresponding Japanese Patent Application No. 2014-031581 (3 pages) with an English Translation (3 pages).

The Notification of First Office Action dated Oct. 31, 2016 in Chinese Patent Application No. 20150086775X (5 pages) with an English Translation (7 pages).

Office Action dated Nov. 20, 2017 in German Patent Application No. 10 2015 001 887.6 (6 pages) with an English translation (7 pages).

* cited by examiner

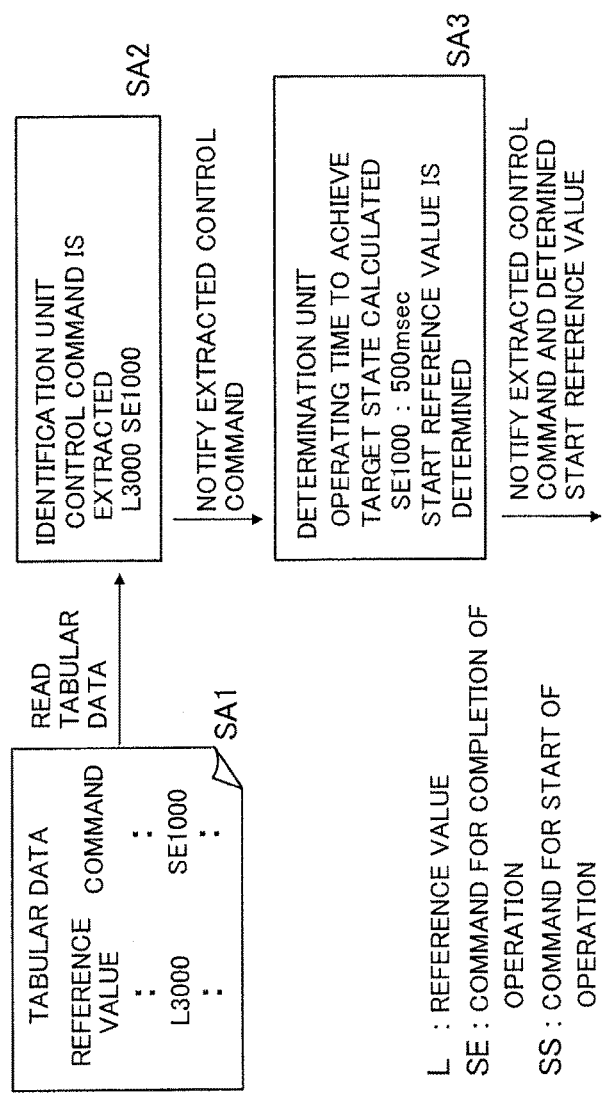

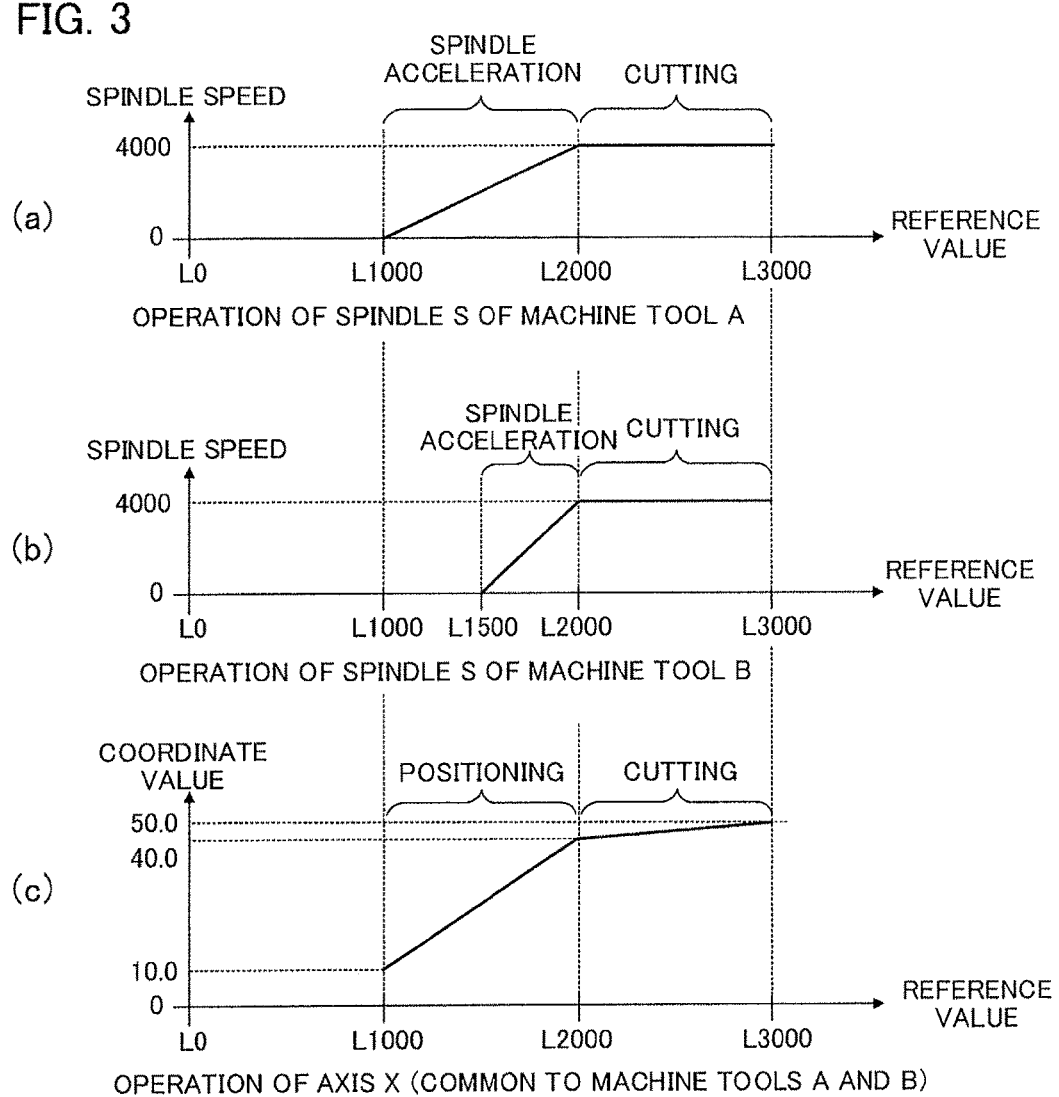

TABULAR DATA <S1> FOR SPINDLE S

| REFERENCE VALUE | COMMAND |
|---|---|
| L0 | S0 |
| L1000 | S4000 |
| ⋮ | ⋮ |

TABULAR DATA <X1> FOR AXIS X

| REFERENCE VALUE | COMMAND |
|---|---|
| ⋮ | ⋮ |
| L1000 | X10.0 |
| L2000 | X45.0 |
| L3000 | X50.0 |
| ⋮ | ⋮ |

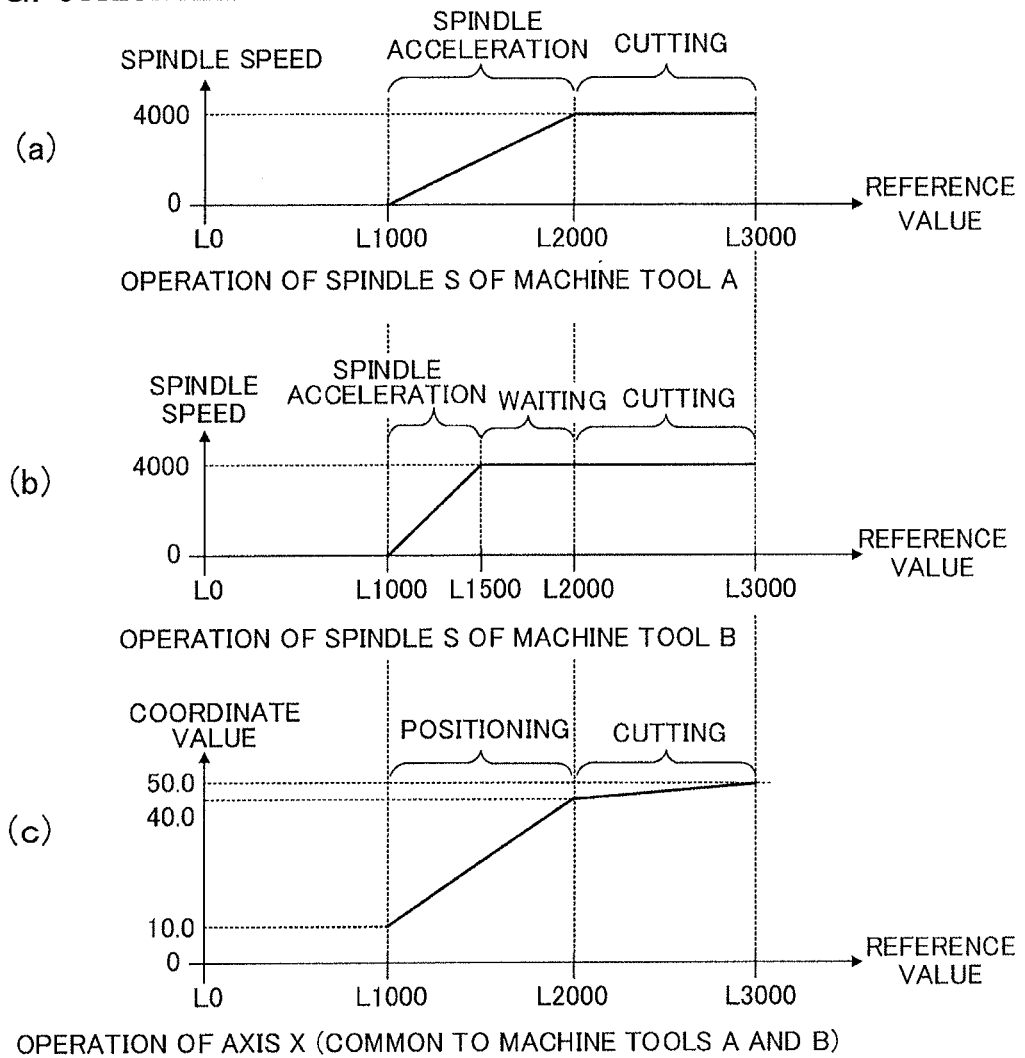

(a) OPERATION OF SPINDLE S OF MACHINE TOOL A (b) OPERATION OF AXIS X OF MACHINE TOOL A (c) OPERATION OF SPINDLE S OF MACHINE TOOL B (d) OPERATION OF AXIS X OF MACHINE TOOL B

NUMERICAL CONTROLLER CONFIGURED FOR OPERATION BASED ON TABULAR DATA

RELATED APPLICATION DATA

This application claims priority under 35 U.S.C. § 119 and/or § 365 to Japanese Application No. 2014-031581 filed Feb. 21, 2014, the entire contents is incorporated herein by reference.

BACKGROUND OF THE INVENTION

Field of the Invention

The present invention relates to a numerical controller configured for operation based on tabular data, and more particularly, to a numerical controller having a function of specifying a reference value for control to achieve a target state based on tabular data.

Description of the Related Art

A path table operation function is generally known as a method of drivingly controlling control axes in synchronism with one another and with the movement of a reference axis. In this method, position information on the control axes corresponding to the position of the reference axis is previously stored in tabular data in a memory or the like. Based on the information stored in the tabular data, the control axes are operated in synchronism with the reference axis. According to this function, the tabular data (path table program), in which a time, axis position, spindle position, or auxiliary function, such as an M code, are set, are stored in advance in the memory or a network-connected storage device and are sequentially read as the axes are driven.

Japanese Patent Applications Laid-Open No. 59-177604 and No. 2003-303005 disclose numerical controllers based on the so-called path table operation function or electronic cam control. Thus, a tool operation independent of a machining program can be freely performed, so that a reduction in machining time and improvement in machining accuracy can be achieved.

A time, axis position, or spindle position that serves as a reference (hereinafter referred to as "reference value") and a command for controlling an axis, spindle, or auxiliary function corresponding to the reference value are described in conventional tabular data. The operation for the command for controlling the state of the axis, spindle, or auxiliary function is started when the reference value is achieved. For a command for controlling the rotational speed of the spindle, for example, acceleration or deceleration for a specified rotational speed is started when the described reference value is achieved. For a spindle indexing command, on the other hand, spindle indexing is started when the reference value is achieved.

A certain operating time is required to achieve the specified rotational speed after the start of the acceleration or deceleration of the spindle and to complete the indexing after the start of the spindle indexing operation. For the command for controlling the state of the axis, spindle, or auxiliary function, it is necessary to take account of an operating time to achieve a target state based on a reference value for the execution of an operation start command. Thus, the reference value for the start of the operation is determined by previously obtaining the operating time by calculation or measurement for each command.

However, the operating time to achieve the target state for each command for controlling the state of the axis, spindle, or auxiliary function varies depending on the machine configuration of a machine tool and parameter setting. In this case, the operating time may be the time for the spindle to achieve the specified rotational speed or the time to complete the spindle indexing. In some cases, therefore, differences in power consumption and operating time may be caused, depending on the machine configuration of the machine tool and parameter setting, despite the use of the same tabular data for operation. Consequently, in the case of the command for controlling the state of the axis, spindle, or auxiliary function, it is necessary to calculate the operating time to achieve the target state after the start of the operation and create optimal tabular data for the machine configuration of each machine tool and for each parameter setting. Possibly, therefore, the work may be complicated.

SUMMARY OF THE INVENTION

Accordingly, the object of the present invention is to provide a numerical controller capable of achieving optimal control for the machine configuration of each machine tool or for each parameter setting based on the same tabular data.

A numerical controller configured for operation based on tabular data according to the present invention comprises an identification unit, a determination unit, and a creation unit. The tabular data includes a time, an axis position, or a spindle position, which serves as a reference, an operation start command for the start of an operation at the time, the axis position, or the spindle position as the reference, and a control command for controlling an axis, a spindle, or an auxiliary function at the time, the axis position, or the spindle position as the reference. The identification unit identifies the control command in the tabular data, the determination unit calculates an operating time to achieve a target state for the control command identified by the identification unit and determines a time, an axis position, or a spindle position, which serves as a reference for the start of an operation, based on the identified control command, and the creation unit creates the command for the start of the operation at the time, the axis position, or the spindle position as the reference determined by the determination unit.

The identification unit may comprise an identifying condition determination unit configured to determine a condition for identifying the control command based on the tabular data, a parameter, or a signal input.

Alternatively, the determination unit may comprise a reference value changing unit configured to change the determined time, the axis position, or the spindle position as the reference for the start of the operation based on an input from an external device or a signal state.

Alternatively, the creation unit may comprise a start condition adding unit configured to add a condition for starting the operation to the created command.

Alternatively, the numerical controller configured for operation based on tabular data may comprise a conversion processing unit configured to convert the tabular data created in the form of a text file to executable data, store the executable data in a storage unit, and control the axis position, the spindle position, or the auxiliary function while reading the executable data from the storage unit, and the conversion processing unit may comprise the identification unit, the determination unit, and the creation unit.

Further, the numerical controller may comprise a command insertion unit configured to insert the command for the start of the operation created by the creation unit into the executable data, when the conversion processing unit converts the tabular data to executable data.

According to the present invention configured as described above, there can be provided a numerical controller capable of achieving optimal control for the machine configuration of each machine tool or for each parameter setting based on the same tabular data.

BRIEF DESCRIPTION OF THE DRAWINGS

The above and other objects and features of the present invention will be obvious from the ensuing description of embodiments with reference to the accompanying drawings, in which:

FIG. 1 is a diagram showing the concept of the present invention;

FIGS. 2A and 2B are diagrams showing tabular data according to a first embodiment;

FIG. 3 is a diagram showing operations of a spindle and an axis according to the first embodiment;

FIGS. 4A and 4B are diagrams showing tabular data according to a second embodiment;

FIG. 9 is a diagram showing operations of a spindle and an axis according to the conventional operation;

FIGS. 10A and 10B are diagrams showing tabular data according to the conventional operation;

DETAILED DESCRIPTION OF THE PREFERRED EMBODIMENTS

Conventional operations and their problems will be described first.

In some conventional operations, the operating time from the execution of a command for controlling the state of an axis, spindle, or auxiliary function until a target state is achieved varies depending on the machine configuration of a machine tool and parameter setting, despite the use of the same tabular data for operation, so that electric power may be consumed excessively and operating hours may increase.

The following is a description of specific examples. First, there will be described how electric power is consumed excessively by the control of a spindle S based on tabular data. In this example, a time, axis position, or spindle position that serves as a reference for the execution of a command for controlling an axis, spindle, or auxiliary function, such as an M code, is generally handled as a reference value.

Figures 7, 8A, 8B:
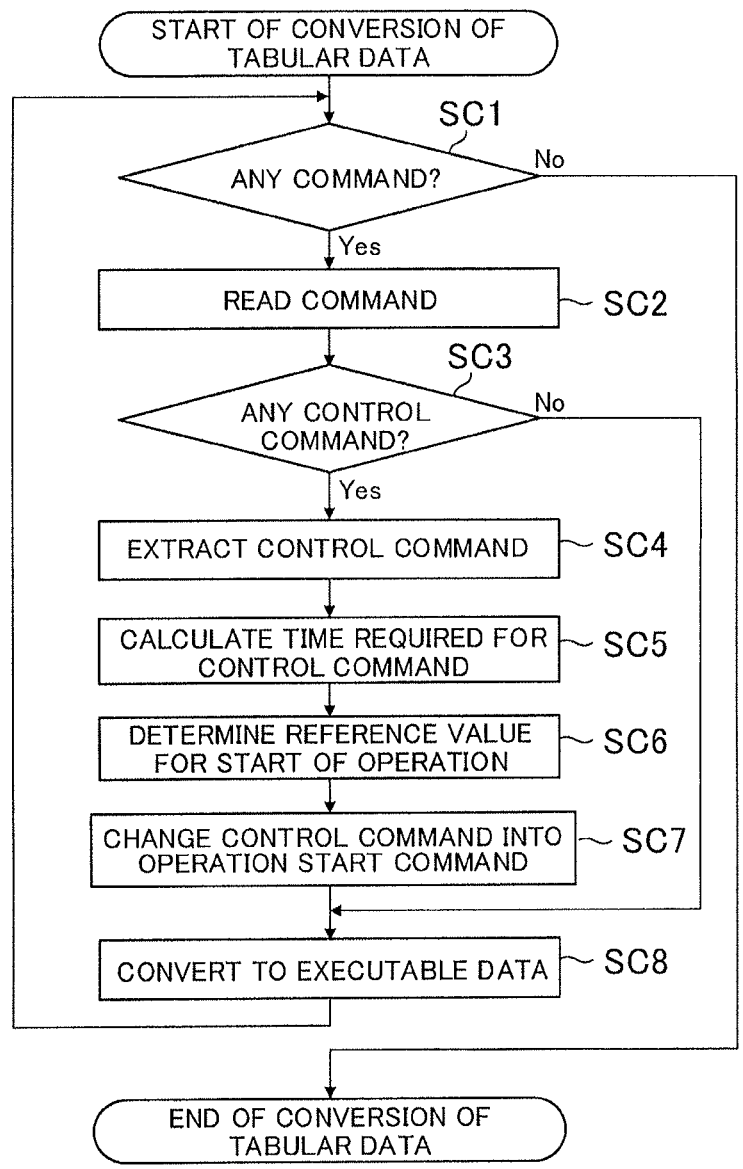
FIG. 7 is a flowchart showing a flow of operational steps according to the embodiment in which identification of a control command, calculation of an operating time, conversion of the control command, etc., are performed in converting tabular data to executable data, such as binary data.
FIGS. 8A and 8B are diagrams showing tabular data according to the conventional operation.

FIGS. 8A and 8B show the tabular data. Specifically, FIG. 8A shows tabular data <S1> for the spindle S, and FIG. 8B shows tabular data <X1> for an axis X. In FIG. 8A, symbol L designates a real-time address of a reference value (msec) described in tabular data for the execution of a command. Commands S0 and S4000 are used to start acceleration or deceleration for setting the rotational speed of the spindle to 0 rpm and 4,000 rpm, respectively.

In FIG. 8B, on the other hand, symbol L designates a real-time address of a reference value (msec) described in tabular data for the execution of a command. Commands X10.0, X45.0 and X50.0 are assumed to designate addresses indicative of machine coordinate values (mm) described in tabular data in which the axis X at the reference value is located. The data of FIG. 8B indicate that the axis is positioned at a coordinate value 45.0 between reference values L1000 and L2000 and cutting is performed to a position corresponding to a coordinate value 50.0 between reference values L2000 and L3000.

Now let us assume that the tabular data shown in FIGS. 8A and 8B (the tabular data <S1> for the spindle S of FIG. 8A and the tabular data <X1> for the axis X of FIG. 8B) are used in common in different machine tools. Two machine tools A and B are assumed to be different in acceleration time for the spindle to achieve a specified rotational speed. Specifically, it is assumed that the acceleration times for the spindles of the machine tools A and B to achieve the specified rotational speed (4,000 rpm) are 1,000 msec and 500 msec, respectively.

FIG. 9 shows the state of operations based on the above assumptions. FIG. 9(a) shows the operation of the spindle S of the machine tool A, FIG. 9(b) shows that of the machine tool B, and FIG. 9(c) shows the operation of the axis X common to the machine tools A and B.

As shown in FIG. 9(a), the acceleration time for the spindle of the machine tool A to achieve the specified rotational speed (4,000 rpm) is 1,000 msec. If the spindle starts to accelerate at the reference value L1000, therefore, the specified rotational speed is achieved at the reference value L2000. Then, the axis X starts cutting at the reference value L2000, as shown in FIG. 9(c), so that the spindle achieves the specified rotational speed just at a right time.

In contrast, the acceleration time for the spindle of the machine tool B to achieve the specified rotational speed (4,000 rpm) is 500 msec. If the spindle starts to accelerate at the reference value L1000, therefore, the specified rotational speed is inevitably achieved at a reference value L1500. Here the reference value for the start of the cutting work of the axis X specified by the tabular data of FIG. 8B is L2000. As shown in FIG. 9(b), therefore, the start of the cutting work must be awaited with the spindle kept rotating at the specified rotational speed, so that electric power is consumed excessively.

The following is a description of an example in which operating hours are increased by the control of the spindle S based on tabular data. FIGS. 10A and 10B show the tabular data. Specifically, FIG. 10A shows tabular data <S2> for the spindle S, and FIG. 10B shows tabular data <X2> for the axis X. In FIG. 10A, symbol L designates a real-time address of a reference value (msec) described in tabular data for the execution of a command. A command S3000 is used to start acceleration or deceleration for setting the rotational speed of the spindle to 3,000 rpm, and G96 is a command to start indexing of the spindle.

In FIG. 10B, on the other hand, symbol L designates a real-time address of a reference value (msec) described in tabular data for the execution of a command. Commands X10.0, X45.0 and X50.0 are assumed to designate addresses indicative of machine coordinate values (mm) described in tabular data in which the axis X at the reference value is located. The data of FIG. 10B indicate that the axis is positioned at a coordinate value 45.0 between reference values L1000 and L2000 and cutting is performed to a position corresponding to a coordinate value 50.0 between reference values L2000 and L3000.

Now let us assume that the tabular data shown in FIGS. 10A and 10B (the tabular data <S2> for the spindle S of FIG. 10A and the tabular data <X2> for the axis X of FIG. 10B) are used in common in different machine tools. Two machine tools A and B are assumed to be different in spindle indexing time. Specifically, it is assumed that the spindle indexing times of the machine tools A and B are 1,000 msec and 1,500 msec, respectively.

Figure 11A:
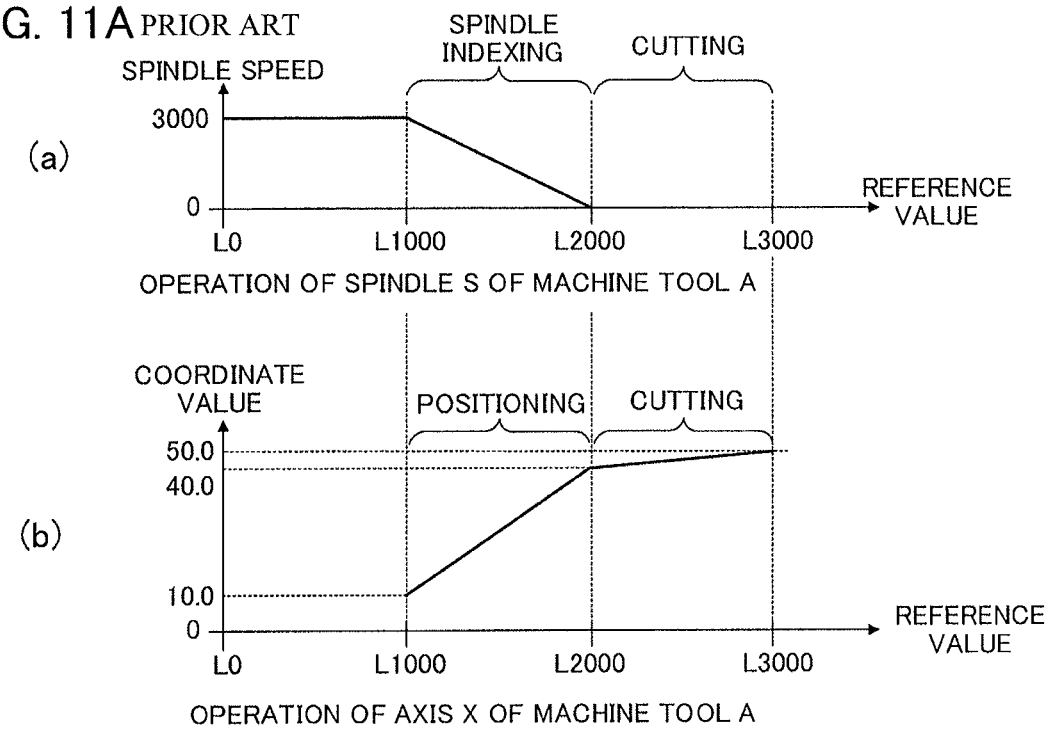
FIGS. 11A and 11B are diagrams showing operations of the spindle and the axis according to the conventional operation.
Figure 11B:
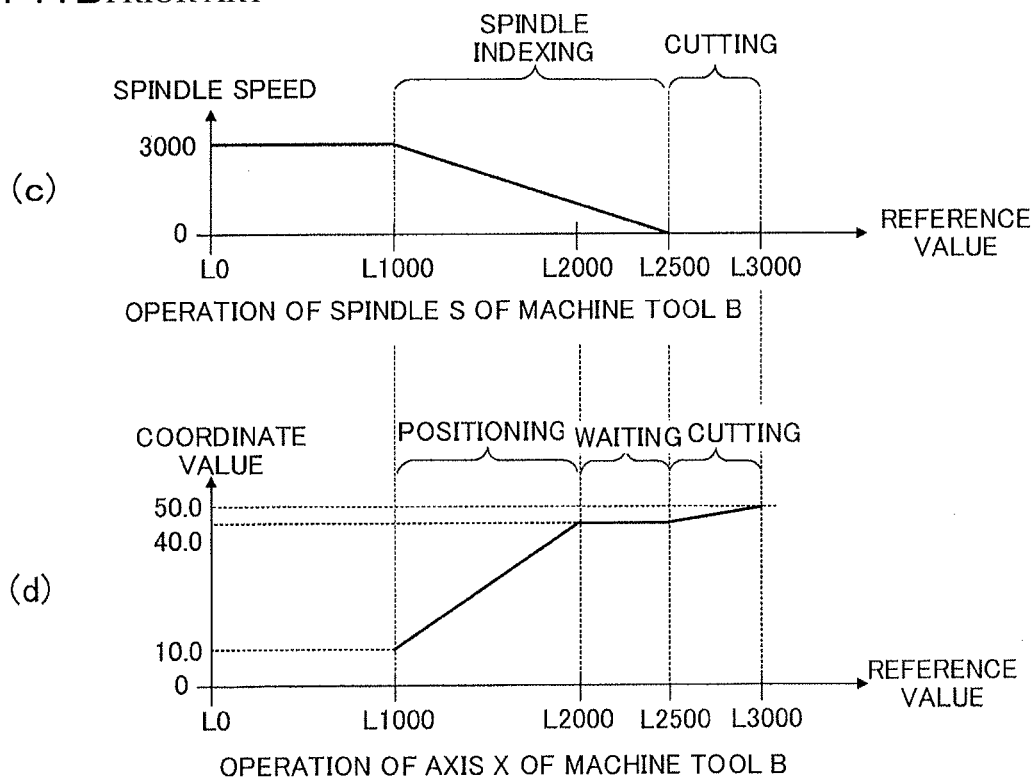

FIGS. 11A and 11B show the state of operations based on the above assumptions. FIG. 11A(a) shows the operation of the spindle S of the machine tool A, FIG. 11A(b) shows the operation of the axis X of the machine tool A, FIG. 11B(c) shows the operation of the spindle S of the machine tool B, and FIG. 11B(d) shows the operation of the axis X of the machine tool B.

As shown in FIG. 11A(a), the spindle indexing time of the machine tool A is 1,000 msec. If the spindle starts to decelerate at the reference value L1000, therefore, the indexing is completed at the reference value L2000. Then, the axis X starts cutting at the reference value L2000, as shown in FIG. 11A(b), so that the spindle indexing is completed just at a right time.

In contrast, the spindle indexing time of the machine tool B is 1,500 msec. If the spindle starts to decelerate at the reference value L1000, as shown in FIG. 11B(c), therefore, the indexing is inevitably completed at a reference value L2500. Here the reference value for the start of the cutting work of the axis X specified by the tabular data of FIG. 10B is L2000. After the axis X is positioned at the reference value L2000, as shown in FIG. 11B(d), however, the start of cutting work must be awaited until the completion of the spindle indexing during the interval from L2000 to L2500, therefore, cutting is started at the reference value L2500 for the completion of the indexing. Consequently, the reference values described in the subsequent tabular data are controlled with a delay corresponding to a waiting time of 500 msec, so that operating hours are inevitably increased.

In consideration of these problems, an operator calculates or measures the operating time from the execution of the command for controlling the axis, spindle, or auxiliary function until the target state is achieved for the machine configuration of each machine tool and for each parameter setting and obtains reference values for transfer to the next process. Therefore, it is necessary to create optimal tabular data for the machine configuration of each machine tool and for each parameter setting. To attain this, however, a number of tabular data must be created, possibly requiring complicated work.

Some embodiments of the present invention provides an identification unit, determination unit, and creation unit. The identification unit enables specification of the command for controlling the axis, spindle, or auxiliary function and the time, axis position, or spindle position (hereinafter referred to as "reference value") as the reference for the achievement of the target state for the control command and identifies the command and the reference value. The determination unit calculates the operating time to achieve the target state for the command and determines the reference value for the start of the operation. The creation unit creates a command to start the operation based on the identified command. Thus, optimal control can be achieved based on the same tabular data despite differences in the machine configuration and parameter setting.

FIG. 1 is a diagram showing the concept of some embodiments. First, tabular data, such as those in Step SA1, which define the correspondence between the reference value and the command, are provided in advance. These tabular data can be previously stored in a memory in a numerical controller, an external storage unit connected to the numerical controller, a network-connected storage device, etc.

Then, as described in Step SA2, the tabular data are read by the identification unit. The reference value L3000 and a control command, such as SE1000, are extracted out of these data. SE and SS designate commands for the completion and start, respectively, of the operation. In the extraction, a command extracted as the control command for the target state can be determined based on the tabular data, parameter setting, or signal input. In this way, conditions for the extraction of an optimal control command for the machine configuration, operation state, etc., can be set in response to control commands for a plurality of target states, described in the tabular data, during the operation of the data. Further, the control commands for the target states can be designed so as not to be extracted while deceleration is stopped due to an alarm or the like. The control command is notified to the determination unit in the next stage.

As described in Step SA3, the determination unit calculates the operating time to achieve the target state for the control command for the machine configuration of each machine tool and for each parameter setting. The reference value for the start of the operation is determined based on the result of the calculation. In order to adjust the difference between the reference value and the real time caused by override setting, a reference value changing unit is provided for further changing the reference value determined in the determination unit. The extracted control command and the determined reference value for the start are notified to the creation unit in the next stage.

As described in Step SA4, the creation unit creates the command to start the operation based on the determined reference value. Specifically, the reference value for the time to start the operation is changed from 3,000 msec to 2,500 msec, based on the mechanical characteristics of the machine tool, for example. Also, a start condition adding unit is provided for adding conditions for starting the operation to the created command to start the operation. A control mode, an input signal, etc., to allow the start of the operation can be specified as the conditions for starting the operation.

The operations by the identification unit, determination unit, and creation unit described in Steps SA2, SA3 and SA4 are not limited to execution during the operation based on the tabular data and may be performed as the tabular data are converted to executable data, such as binary data. Further, the operation start command created by the creation unit may be inserted into executable data, such as binary data.

Thus, the tabular data need not be created for the machine configuration of each machine tool and for each parameter setting, and optimal control can be achieved for the machine configuration of each machine tool and for each parameter setting based on the same tabular data.

First Embodiment

The following is a description of some embodiments of the present invention. First, there will be described how to optimize electric power consumption for the control of a spindle S based on tabular data. Also in the present embodiment, a time, axis position, or spindle position that serves as a reference for the execution of a command for controlling an axis, spindle, or auxiliary function, such as an M code, is generally handled as a reference value.

FIGS. 2A and 2B show the tabular data. Specifically, FIG. 2A shows tabular data <S3> for the spindle S, and FIG. 2B shows tabular data <X3> for an axis X. In FIG. 2A, symbol L designates a real-time address of a reference value (msec) described in tabular data for the execution of a command. A command S0 is used to start acceleration or deceleration for setting the rotational speed of the spindle to 0 rpm, and a command SE4000 is used to complete acceleration or deceleration for setting the rotational speed of the spindle to 4,000 rpm.

In FIG. 2B, on the other hand, symbol L designates a real-time address of a reference value (msec) described in tabular data for the execution of a command. Commands X10.0, X45.0 and X50.0 are assumed to designate addresses indicative of machine coordinate values (mm) described in tabular data in which the axis X at the reference value is located. The data of FIG. 2B indicate that the axis is positioned at a coordinate value 45.0 between reference values L1000 and L2000 and cutting is performed to a position corresponding to a coordinate value 50.0 between reference values L2000 and L3000.

Now let us assume that the tabular data shown in FIGS. 2A and 2B (the tabular data <S3> for the spindle S of FIG. 2A and the tabular data <X3> for the axis X of FIG. 2B) are used in common in different machine tools. Two machine tools A and B are assumed to be different in acceleration time for the spindle to achieve a specified rotational speed. Specifically, it is assumed that the acceleration times for the spindles of the machine tools A and B to achieve the specified rotational speed (4,000 rpm) are 1,000 msec and 500 msec, respectively. The acceleration time of each machine tool can be calculated based on a given command, the feed rate of the machine tool, motor performance, etc.

FIG. 3 shows the state of operations based on the above assumptions. FIG. 3(a) shows the operation of the spindle S of the machine tool A, FIG. 3(b) shows that of the machine tool B, and FIG. 3(c) shows the operation of the axis X common to the machine tools A and B.

As shown in FIG. 3(a), the acceleration time for the spindle of the machine tool A to achieve the specified rotational speed (4,000 rpm) is 1,000 msec. If the spindle starts to accelerate at the reference value L1000, therefore, the specified rotational speed is achieved at the reference value L2000. Then, the axis X starts cutting at the reference value L2000, as shown in FIG. 3(c), so that the spindle achieves the specified rotational speed just at a right time.

The acceleration time for the spindle of the machine tool B to achieve the specified rotational speed (4,000 rpm) is 500 msec. In consideration of the acceleration time of the machine tool B, therefore, the acceleration start time is changed from the reference value L1000 to a reference value L1500. Thereupon, the rotational speed of the spindle achieves 4,000 rpm at the reference value L2000, as shown in FIG. 3(b). Also in the case of the machine tool B, therefore, the start of cutting work need not be awaited with the spindle kept rotating. Thus, the spindle can achieve the specified rotational speed just at a right time without consuming excessive electric power. FIG. 3(c) is a diagram showing the operation of the axis X common to the machine tools A and B.

Second Embodiment

There will now be described how to optimize the operating time for the control of a spindle S based on tabular data. FIGS. 4A and 4B show the tabular data. Specifically, FIG. 4A shows tabular data <S4> for the spindle S, and FIG. 4B shows tabular data <X4> for an axis X. In FIG. 4A, symbol L designates a real-time address of a reference value (msec) described in tabular data for the execution of a command. A command S3000 is used to start acceleration or deceleration for setting the rotational speed of the spindle to 3,000 rpm, and GE96 is a command to complete indexing of the spindle.

In FIG. 4B, on the other hand, symbol L designates a real-time address of a reference value (msec) described in tabular data for the execution of a command. Commands X10.0, X45.0 and X50.0 are assumed to designate addresses indicative of machine coordinate values (mm) described in tabular data in which the axis X at the reference value is located. The data of FIG. 4B indicate that the axis is positioned at a coordinate value 45.0 between reference values L1000 and L2000 and cutting is performed to a position corresponding to a coordinate value 50.0 between reference values L2000 and L3000.

Now let us assume that the tabular data shown in FIGS. 4A and 4B (the tabular data <S4> for the spindle S of FIG. 4A and the tabular data <X4> for the axis X of FIG. 4B) are used in common in different machine tools. Two machine tools A and B are assumed to be different in spindle indexing time. Specifically, it is assumed that the spindle indexing times of the machine tools A and B are 1,000 msec and 1,500 msec, respectively.

Figure 5A:
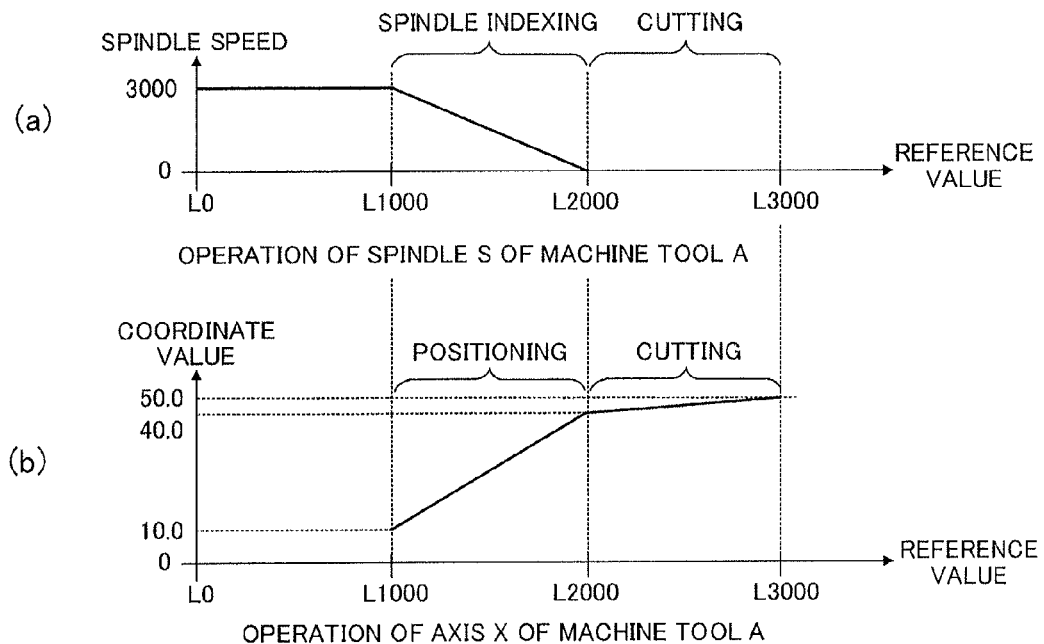
FIGS. 5A and 5B are diagrams showing operations of a spindle and an axis according to the second embodiment.
Figure 5B:
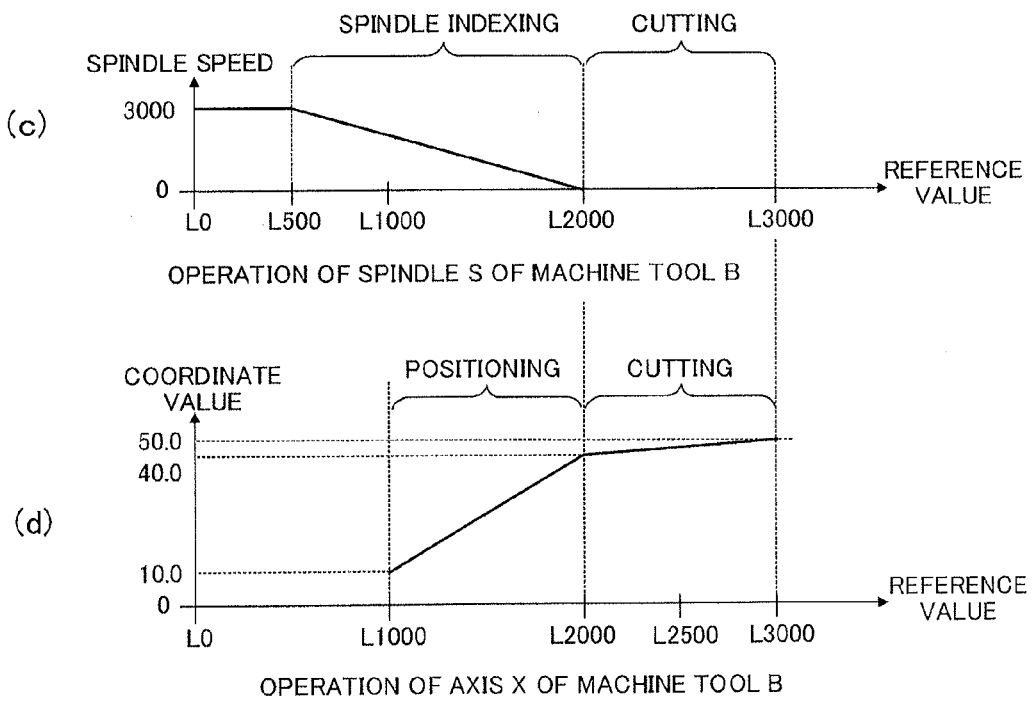

FIGS. 5A and 5B show the state of operations based on the above assumptions. FIG. 5A(a) shows the operation of the spindle S of the machine tool A, FIG. 5A(b) shows the operation of the axis X of the machine tool A, FIG. 5B(c) shows the operation of the spindle S of the machine tool B, and FIG. 5B(d) shows the operation of the axis X of the machine tool B.

As shown in FIG. 5A(a), the spindle indexing time of the machine tool A is 1,000 msec. If the spindle starts to decelerate at the reference value L1000, therefore, the indexing is completed at the reference value L2000. Then, the axis X starts cutting at the reference value L2000, as shown in FIG. 5A(b), so that the spindle indexing is completed just at a right time.

In contrast, the spindle indexing time of the machine tool B is 1,500 msec. If the spindle starts to decelerate at the reference value L1000, therefore, spindle indexing is inevitably completed at a reference value L2500. In consideration of the time to index the spindle of the machine tool B, according to the present embodiment, the deceleration start time is changed from the reference value L1000 to a reference value L500. Thereupon, the positioning of the axis X is completed at the reference value L2000, as shown in FIG. 5B(d), so that the spindle indexing is completed just at a right time. Thus, unnecessary waiting time can be reduced to achieve optimal control by using the same tabular data for both the machine tools A and B.

Figure 6:
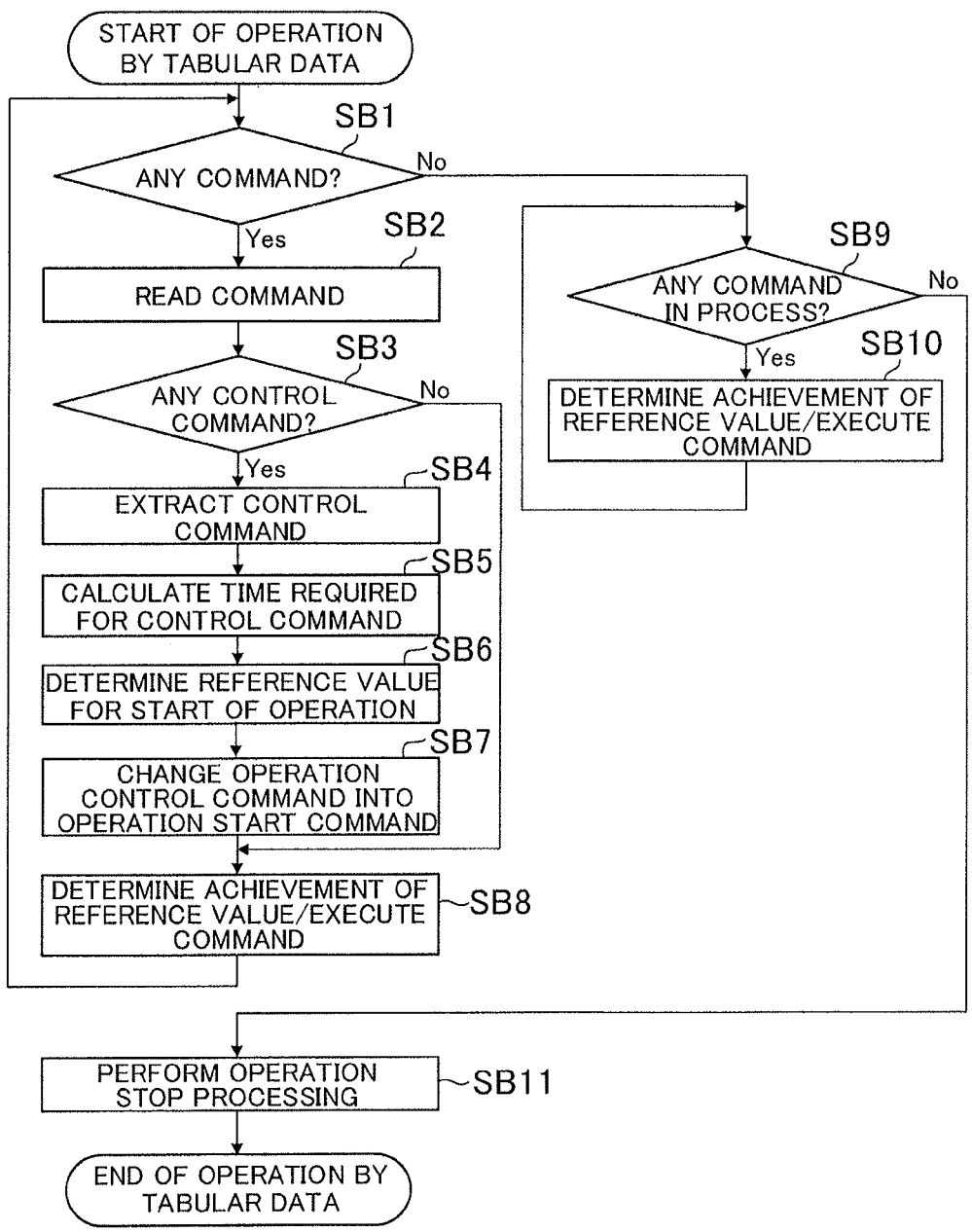
FIG. 6 is a flowchart showing a flow of operational steps for operation based on tabular data according to the embodiment.

The following is a sequential description of steps of the flowchart of FIG. 6 according to the present embodiment for operation based on tabular data.

(Step SB1) It is determined whether or not there is any command in the tabular data. If there is a command (YES), the processing proceeds to Step SB2. If not (NO), the processing proceeds to Step SB9.

(Step SB2) The command is read.

(Step SB3) It is determined whether or not any control command is issued. If a control command is issued (YES), the processing proceeds to Step SB4. If not (NO), the processing proceeds to Step SB8.

(Step SB4) The control command is extracted.

(Step SB5) The time required for the control command extracted in Step SB4 is calculated for each machine tool.

(Step SB6) The reference value for the start of the operation is determined based on the required time for the control command calculated in Step SB5.

(Step SB7) The operation control command is changed into the operation start command based on the start reference value determined in Step SB6.

(Step SB8) The achievement of the reference value is determined as the command is executed, whereupon the processing returns to Step SB1.

(Step SB9) The presence of any command in process is determined. If there is a command in process (YES), the processing proceeds to Step SB10. If not (NO), the processing proceeds to Step SB11.

(Step SB10) The achievement of the reference value is determined as the command is executed, whereupon the processing returns to Step SB9.

(Step SB11) Operation stop processing is performed.

The following is a sequential description of steps of the flowchart of FIG. 7 for the embodiment in which identification of the control command, calculation of the operating time, conversion of the control command, etc., are performed in converting tabular data to executable data, such as binary data.

(Step SC1) It is determined whether or not there is any command in the tabular data. If there is a command (YES), the processing proceeds to Step SC2. If not (NO), conversion of the tabular data ends.

(Step SC2) The command is read.

(Step SC3) It is determined whether or not any control command is issued. If a control command is issued (YES), the processing proceeds to Step SC4. If not (NO), the processing proceeds to Step SC8.

(Step SC4) The control command is extracted.

(Step SC5) The time required for the control command extracted in Step SC4 is calculated for each machine tool.

(Step SC6) The reference value for the start of the operation is determined based on the required time for the control command calculated in Step SC5.

(Step SC7) The operation control command is changed into the operation start command based on the start reference value determined in Step SC6.

(Step SC8) The tabular data are converted to executable data, such as binary data, whereupon the processing returns to Step SC1.

In the example described above with reference to the flowchart of FIG. 7, the identification of the control command, calculation of the operating time, conversion of the control command, etc., are performed as the tabular data is converted to the executable data, such as binary data. Alternatively, however, control may be made such that the operation start command created by the creation unit is inserted into the executable data, such as binary data, obtained by the conversion.

In the embodiment described above, the time is used as the reference value defined in the tabular data, and the rotational speed of the spindle, positioning of an X-axis, and cutting are commanded. Alternatively, however, the position of the axis or the spindle to be controlled may be used in place of the time as the reference value. Further, some other machining work may be commanded in place of the positioning of the X-axis or the cutting. Alternatively, moreover, the operation of the spindle or a Y- or Z-axis, not the X-axis, may be commanded or an auxiliary function, such as an M code, may be commanded.

In the present embodiment described above, furthermore, the command extracted as the control command for the target state is specified by the tabular data stored in the memory or the like. However, the specification by the tabular data may be replaced with parameter setting or signal input.

In the present embodiment, moreover, the time to start the operation is adjusted based on the performance of each machine tool or the like. However, the factor that affects the adjustment of the operation start time is not limited to the performance of each machine tool. Alternatively, therefore, the operation start time may be adjusted based on some other factors, such as further adjustment of the difference from the reference value caused by override setting or the like.

In starting the operation, furthermore, an additional condition may be used such that a control mode should be set to allow the start of the operation.

The invention claimed is:

1. A numerical controller configured for operation based on tabular data, the numerical controller comprising an identification unit, a determination unit, and a creation unit,
    the tabular data including a time, an axis position, or a spindle position, as a reference,
    an operation start command for the start of an operation at the time, the axis position, or the spindle position as the reference, and
    a control command for controlling an axis, a spindle, or an auxiliary function at the time, the axis position, or the spindle position as the reference,
    the identification unit being configured to identify the control command in the tabular data,
    the determination unit being configured to calculate an operating time to achieve a target state for the control command identified by the identification unit and determine a time, an axis position, or a spindle position, which serves as a reference for the start of the operation of the identified control command, based on the identified control command,
    the creation unit being configured to create the command for the start of the operation at the time, the axis position, or the spindle position as the reference determined by the determination unit,
    the numerical controller controls the axis, the spindle, or the auxiliary command according to the created command.

2. The numerical controller configured for operation based on tabular data according to claim 1, wherein the identification unit comprises an identifying condition determination unit configured to determine a condition for identifying the control command based on the tabular data, a parameter, or a signal input.

3. The numerical controller configured for operation based on tabular data according to claim 1, wherein the determination unit comprises a reference value changing unit configured to change the determined time, the axis position, or the spindle position as the reference for the start of the operation based on an input from an external device or a signal state.

4. The numerical controller configured for operation based on tabular data according to claim 1, wherein the creation unit comprises a start condition adding unit configured to add a condition for starting the operation to the created command.

5. The numerical controller configured for operation based on tabular data according to claim 1, comprising a conversion processing unit configured to convert the tabular data created in the form of a text file to executable data, store the executable data in a storage unit, and control the axis position, the spindle position, or the auxiliary function while reading the executable data from the storage unit, the conversion processing unit comprising the identification unit, the determination unit, and the creation unit.

6. The numerical controller configured for operation based on tabular data according to claim 5, comprising a command insertion unit configured to insert the command for the start of the operation created by the creation unit into the executable data, when the conversion processing unit converts the tabular data to executable data.

* * * * *